UNITED STATES PATENT OFFICE.

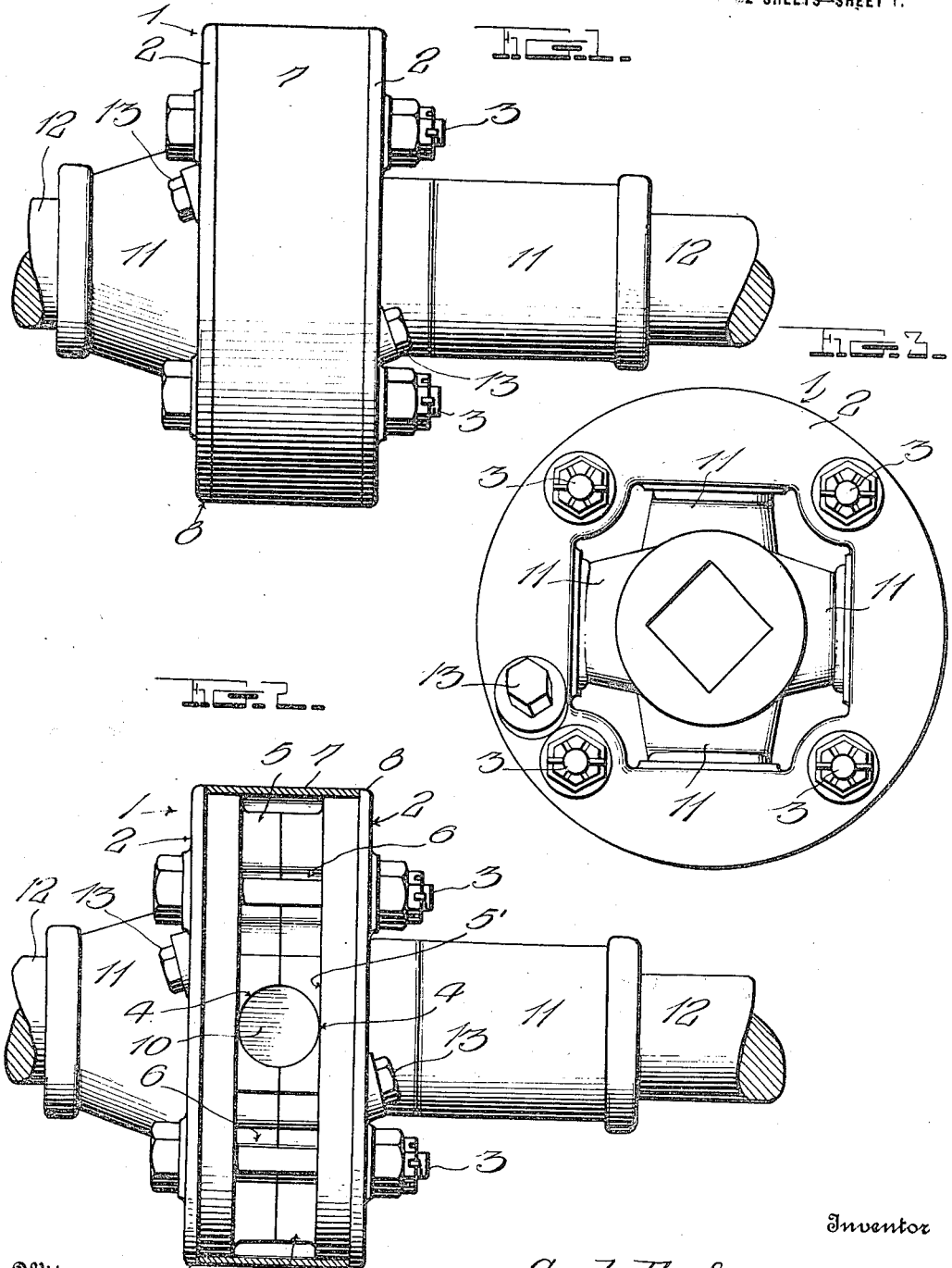

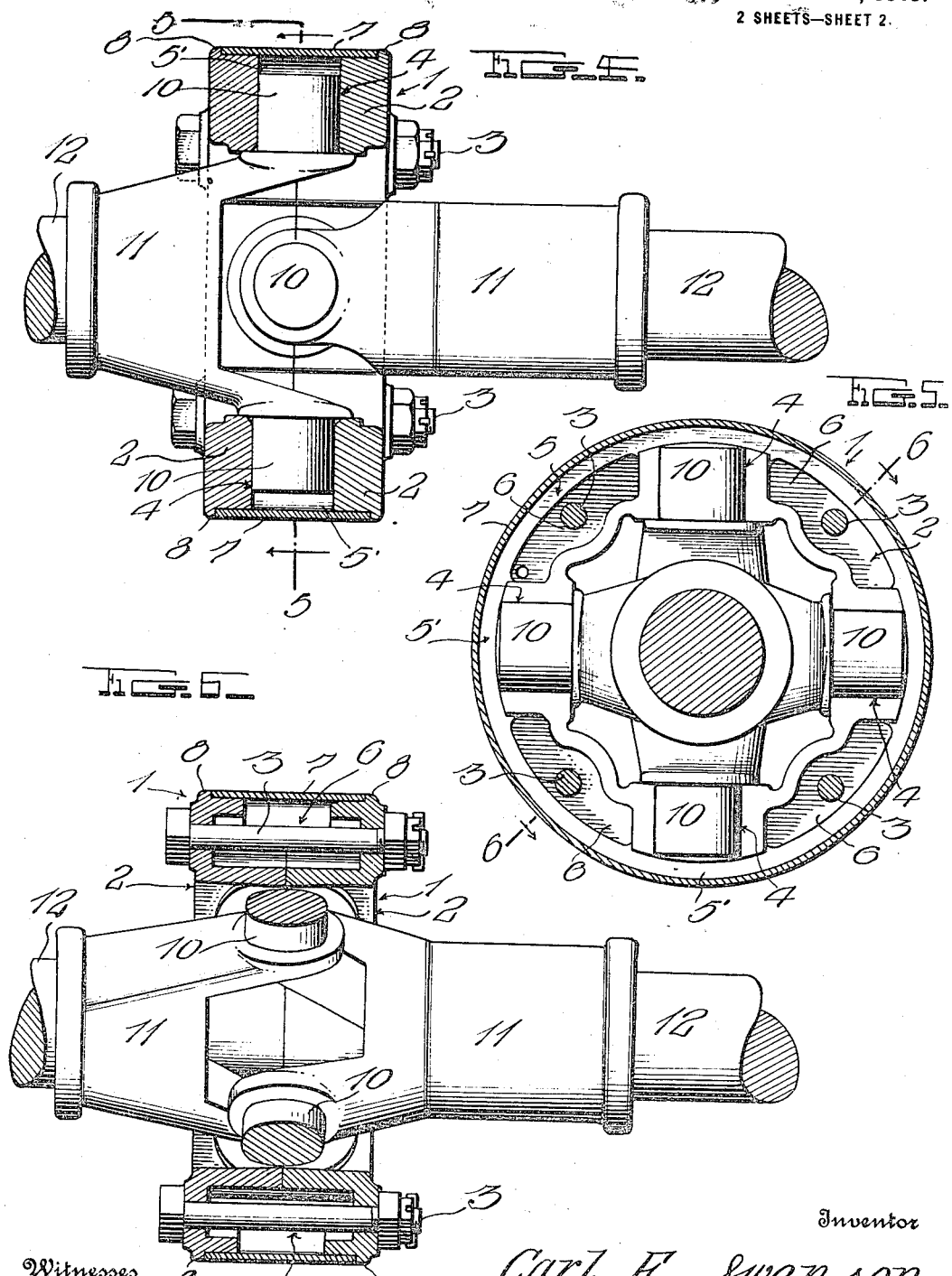

CARL E. SWENSON, OF ROCKFORD, ILLINOIS.

UNIVERSAL JOINT.

1,163,871.    Specification of Letters Patent.    Patented Dec. 14, 1915.

Application filed February 8, 1915. Serial No. 6,815.

*To all whom it may concern:*

Be it known that I, CARL E. SWENSON, a citizen of the United States, residing at Rockford, in the county of Winnebago and State of Illinois, have invented certain new and useful Improvements in Universal Joints; and I do declare the following to be a full, clear, and exact description of the invention, such as will enable others skilled in the art to which it appertains to make and use the same.

My invention relates to improvements in universal joints and has for its object to overcome the most objectionable features of devices of this character as now manufactured, by providing simple and efficient means whereby the various points of friction may be effectively lubricated at all times.

In reducing the invention to an operative structure I provide certain novel features of construction and combination hereinafter described and claimed and shown in the drawings wherein:

Figure 1 is a side elevation of a universal joint constructed in accordance with my invention: Fig. 2 is a similar view with a band to be described in section and disclosing more particularly the disposition of the circumferentially extending grease channel to be described; Fig. 3 is an end view of the joint; Fig. 4 is a vertical longitudinal section thereof with the two shaft sections and parts carried thereby shown in elevation; Fig. 5 is a vertical transverse section as seen along the plane indicated by the line 5—5 of Fig. 4; and, Fig. 6 is an additional longitudinal section as viewed on the plane indicated by the line 6—6 of Fig. 5.

In these drawings, constituting a part of the application, 1 designates an annular connecting member herein shown as formed of a pair of axially alined rings 2 which are clamped together by bolts 3, the inner abutting faces of these rings being provided at four points, spaced 90° from each other, with radially extending grooves 4 which open at their inner and outer ends through the inner and outer sides of the rings as disclosed more particularly in Figs. 2, 4 and 5. When the parts are assembled, it will be noted that the grooves in one ring 2 register with those in the other ring, thus providing cylindrical radially disposed bearings which are spaced 90° from each other around the circumference of the connecting member 1. As hereinbefore suggested, it is the object of the invention to lubricate these bearings. To this end, the abutting edge portions of the peripheries of the two rings 2 are grooved circumferentially as indicated at 5 to provide a continuous grease channel which, at points between the various bearings, is deepened and widened to provide a plurality of grease pockets 6 spaced circumferentially around the member 1 and connected by the portions 5' of the grooves 5 which surround the bearings before described, said portions 5' thereby constituting ports for conveying the lubricating material from the pockets 6 to said bearings, and likewise constituting ports connecting the various pockets as before suggested.

For the purpose of closing the outer sides of the cavities in the periphery of the member 1, a band 7 is provided, this band surrounding said periphery and being held against lateral shifting thereon by circumferentially extending ribs 8 which are formed on the opposite edges thereof. This band, although preferably constructed of metal as disclosed in the drawings and in the form of a complete ring, might well be of any other appropriate design for performing its function, and might well be made in such a manner as to allow it to be removed without disassembling the remainder of the coupling.

Disposed for oscillation in the two pairs of radially extending bearing openings, are two pairs of bearing studs 10 which are formed on a pair of forked heads 11 carried by the two shaft sections 12 which are universally connected by the joint previously described in detail. It will therefore be seen, that the grease which may be packed within the various grease cavities in the periphery of the member 1 before the band 7 is applied, or which may be forced into said cavities through a pair of openings normally closed by screw plugs 13, will effectively lubricate the various bearings and the studs 10, thus preventing a great amount of friction between these parts which would otherwise occur, and thereby increasing the efficiency of the joint and lengthening the life thereof.

In addition to the advantages derived by the provision of the lubricating means, it will be evident that the bearings may be adjusted from time to time as they become worn by filing or grinding the abutting faces of the rings 2 to allow them to be moved farther toward each other by the bolts 3. It will be understood, however, that if the band 7 is made of flexible material, it need not be altered when so adjusting the bearings, but that one of its edges must necessarily be removed if such band is constructed of rigid material. This is a very important feature of the invention, since oil or grease is prevented from leaking from the various bearings, as would undoubtedly occur should the latter become worn and be allowed to remain in this condition without adjustment.

In the foregoing description I have described certain specific formations of carrying out the object of the invention, and in the drawings have shown such specific details, but it is to be understood that I need not be limited thereto otherwise than as disclosed in the appended claim.

I claim:

A universal joint comprising a pair of axially alined rings of equal diameter secured in contact with each other and having their abutting portions grooved radially to form two pairs of bearings, and having such portions recessed between the grooves to provide oil pockets, the adjacent peripheral portions of the two rings being formed with circumferentially extending grooves to provide a continuous oil channel communicating with the aforesaid oil pockets, a flat cylindrical band into which the two rings are forced whereby said band constitutes a closure for the oil channel, the remote edges of said rings being provided with integrally formed annular stop flanges with which the opposite edges of the band contact, and a pair of shaft members having studs received by the aforesaid bearings.

In testimony whereof I have hereunto set my hand in presence of two subscribing witnesses.

CARL E. SWENSON.

Witnesses:
LEVIN FAUST,
A. C. JOHNSON.

Copies of this patent may be obtained for five cents each, by addressing the "Commissioner of Patents, Washington, D. C."